(12) United States Patent  (10) Patent No.: US 7,711,841 B2
Deshpande  (45) Date of Patent: May 4, 2010

(54) SYSTEMS AND METHODS FOR REDUCING THE EFFECTS OF VARIATIONS ON THE PLAYBACK OF STREAMING MEDIA

(75) Inventor: Sachin G. Deshpande, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 573 days.

(21) Appl. No.: 11/426,878

(22) Filed: Jun. 27, 2006

(65) Prior Publication Data
US 2007/0204056 A1 Aug. 30, 2007

Related U.S. Application Data

(60) Provisional application No. 60/777,636, filed on Feb. 28, 2006.

(51) Int. Cl.
G06F 15/16 (2006.01)
(52) U.S. Cl. ...................................................... 709/231
(58) Field of Classification Search ................. 709/204, 709/220–229, 231, 233–236; 370/270, 465, 370/477, 351–358, 230; 348/211–215, 207; 704/500
See application file for complete search history.

(56) References Cited

U.S. PATENT DOCUMENTS

| 5,521,918 | A | 5/1996 | Kim |
| 6,138,189 | A | 10/2000 | Kalkunte |
| 6,366,704 | B1 | 4/2002 | Ribas-Corbera et al. |
| 7,050,465 | B2 | 5/2006 | Leon |
| 2002/0052967 | A1* | 5/2002 | Goldhor et al. ............. 709/231 |
| 2002/0057686 | A1 | 5/2002 | Leon |
| 2004/0057381 | A1 | 3/2004 | Tseng et al. |
| 2004/0066751 | A1 | 4/2004 | Tseng et al. |
| 2004/0081106 | A1 | 4/2004 | Bruhn |
| 2004/0098748 | A1* | 5/2004 | Bo et al. ...................... 725/105 |
| 2004/0194142 | A1 | 9/2004 | Jiang et al. |
| 2006/0009983 | A1* | 1/2006 | Magliaro et al. ............ 704/500 |

(Continued)

FOREIGN PATENT DOCUMENTS

EP 1142257 11/2001

(Continued)

OTHER PUBLICATIONS

Mark Kalman, "Adaptive Media Playout for Low-Delay Video Streaming Over Error-Prone Channels", Jun. 2004, IEEE, vol. 14.*

(Continued)

Primary Examiner—Nathan Flynn
Assistant Examiner—Mark O Afolabi
(74) Attorney, Agent, or Firm—Austin Rapp & Hardman

(57) ABSTRACT

In an exemplary embodiment, a streaming client is playing a media stream that is being streamed from a streaming server. The media stream is being played at a certain playback rate. While the media stream is being played, the level of a streaming buffer is monitored. If it is determined that the level of the streaming buffer is below a defined lower limit, then the playback rate is set equal to a value that is less than the intended playback rate for the media stream. The specific value of the playback rate depends on the level of the streaming buffer.

39 Claims, 12 Drawing Sheets

U.S. PATENT DOCUMENTS

2006/0026294 A1* 2/2006 Virdi et al. .................. 709/232
2007/0133405 A1* 6/2007 Bowra et al. ................. 370/230

FOREIGN PATENT DOCUMENTS

| EP | 0868084 | 11/2002 |
| GB | EP 0971542 | * 12/2000 |
| WO | 00/42753 | 7/2000 |
| WO | 2004/062291 | 7/2004 |

OTHER PUBLICATIONS

"Adaptive Playout for Real-Time Media Streaming," Kalman et al., ISCAS, Arizona, May 2002.

"Adaptive Media Playout for Low Delay Video Streaming over Error-Prone Channels," Kalman et al., IEEE CSVT, Special Issue on Wireless Video, vol. 14, No. 6, pp. 841-851, Jun. 2004.

The Network Simulator (NS2) website, http://www.isi.edu/nsnam/ns/, Jan. 9, 2007.

* cited by examiner

SYSTEMS AND METHODS FOR REDUCING THE EFFECTS OF VARIATIONS ON THE PLAYBACK OF STREAMING MEDIA

RELATED APPLICATIONS

This application is related to and claims priority from U.S. Provisional Patent Application Ser. No. 60/777,636 filed Feb. 28, 2006, for "Systems and Methods for Underflow Prevention Under Varying Channel Conditions," with inventor Sachin G. Deshpande, which is incorporated herein by reference.

TECHNICAL FIELD

The present invention relates generally to computers and computer-related technology. More specifically, the present invention relates to systems and methods for reducing the effects of variations in available network bandwidth and other network variations on the playback of streaming media.

BACKGROUND

Streaming media is media that is consumed while it is being delivered. Streaming technology allows a user to download media files (e.g., audio-video files) for immediate playback, thereby avoiding time-consuming downloads of large files. Audio-video streaming over the Internet has become quite popular.

A streaming server is a software program that is capable of providing a media file to a client program as a stream of media data. A media file may be an audio file, a video file, or an audio-video file (i.e., a file containing both audio and video). Media data is the data within a media file.

A streaming client is a software program that allows a user to play a media file that is being streamed from a streaming server. To play (or play back) a media file refers to converting media data into a user-perceptible form. For example, to play an audio-video file refers to converting video data into moving images and converting the corresponding audio data into audible sounds that may be heard by the user.

A streaming client may utilize a streaming buffer, which is an amount of memory that is used by the streaming client to temporarily store media data. In typical operation, a streaming client does not begin playing a streaming media file until the streaming buffer has been filled to a threshold level. As the streaming client plays the streaming media file, it uses up media data in the buffer. However, at the same time, more media data is being downloaded to the buffer. As long as the data can be downloaded as fast as it is used up in playback, the media file will play smoothly.

Unfortunately, however, the available bandwidth on the network for streaming media can vary based on the channel conditions. As an example in a wireless network, interference from cordless phones, microwaves, and the like can cause the available bandwidth to degrade. Cross-traffic on the network provides another source contributing to variable available bandwidth for streaming media.

Variations in the amount of available network bandwidth can cause problems for streaming media. For example, if the network becomes congested, the rate at which a media file is being streamed may be less (even significantly less) than the rate at which the streaming client is consuming media data from the streaming buffer. If this continues for some period of time, the streaming buffer may become depleted so that there is no media data remaining in the streaming buffer. This condition is sometimes referred to as buffer underflow (or, alternatively, buffer underrun). When buffer underflow occurs, the streaming client temporarily stops playing the media file until it is able to receive and re-buffer enough media data to restart playback. Of course, such interruptions in playback of the media file can be frustrating to the user of the streaming client.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

DETAILED DESCRIPTION

Figure 1:
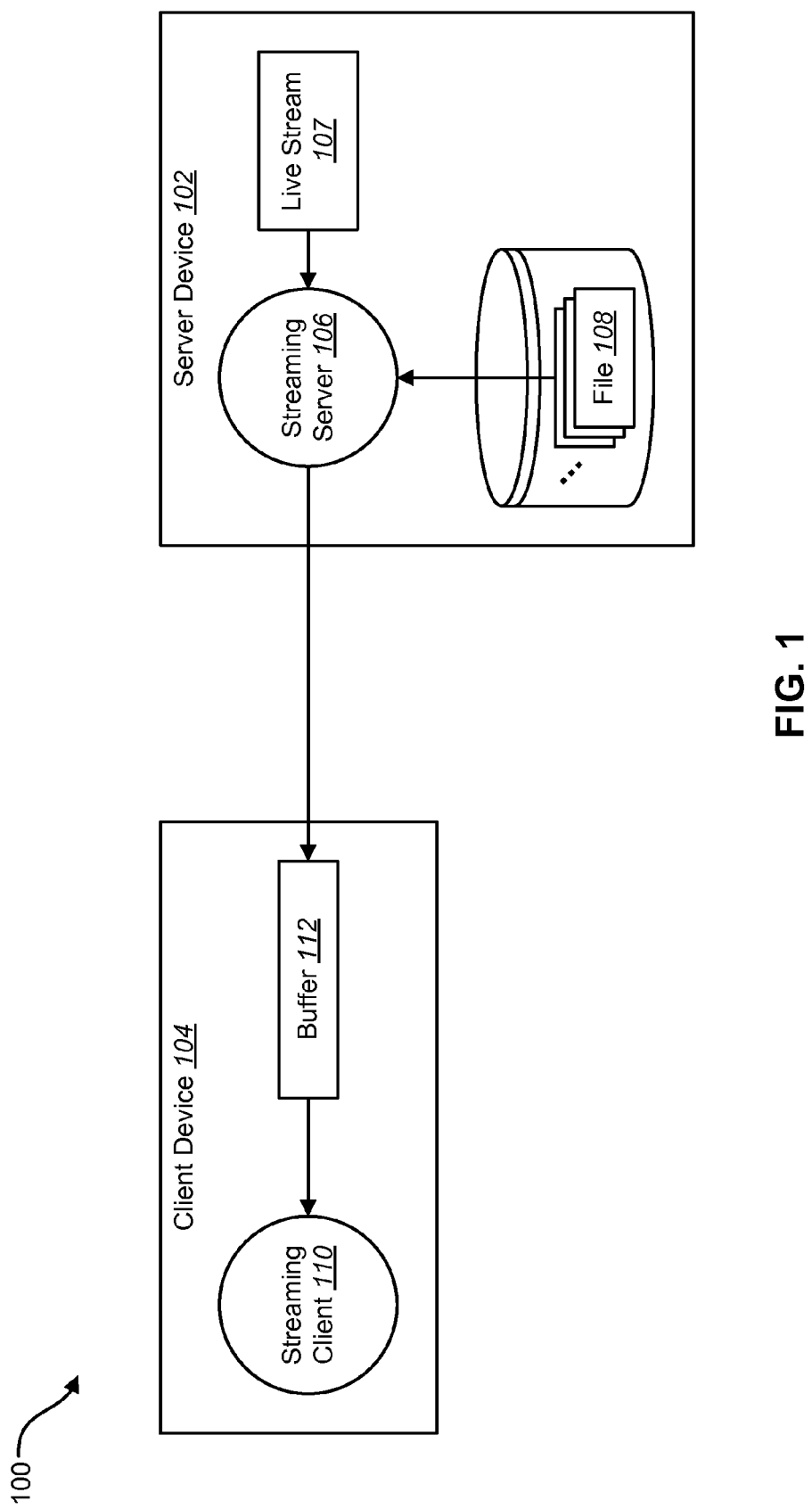
FIG. 1 illustrates an exemplary system in which embodiments may be practiced.

A method for reducing effects of network and other variations on playback of media being streamed from a streaming server is disclosed. In accordance with the method, a lower limit may be defined for a level of a streaming buffer. A media stream may be received from a streaming media server as a stream of media data. The media stream may be played back from the streaming buffer at a playback rate. The level of the streaming buffer may be monitored during the playback of the media file to determine whether the level of the streaming buffer is below the lower limit. If it is determined that the level of the streaming buffer is below the lower limit, the playback rate may be set at a value that is less than an intended playback rate for the media stream. The value of the set playback rate may depend on the level of the streaming buffer.

Defining the lower limit for the level of the streaming buffer may involve defining a slow playback condition. The slow playback condition may depend on the level of the streaming buffer at time t, how much media data was added to the streaming buffer between time t and time t+T, a target level for the streaming buffer, and a margin for the streaming buffer. An exemplary formula for the slow playback condition will be discussed below.

Monitoring the level of the streaming buffer to determine whether the level of the streaming buffer is below the lower limit may involve determining the level of the streaming buffer at time t, determining how much media data is added to the streaming buffer between time t and time t+T, and evaluating the slow playback condition. Setting the playback rate at a value that is less than the intended playback rate may involve multiplying the intended playback rate by a scaling factor that is less than one. The scaling factor may depend on the level of the streaming buffer at time t, how much media data was added to the streaming buffer between time t and time t+T, and a target level for the streaming buffer. The scaling factor may also depend on a minimum scale factor and an estimated amount of data that will be received in timestamp units at the receiver in the next $l^{th}$ time segment. Some exemplary formulas for calculating the scaling factor will be discussed below.

An upper limit may be defined for the level of the streaming buffer. The level of the streaming buffer may be monitored during the playback of the media file to determine whether the level of the streaming buffer is above the upper limit. If it is determined that the level of the streaming buffer is above the upper limit, the playback rate may be set at a value that is greater than an intended playback rate for the media stream. The value of the playback rate may depend on the level of the streaming buffer.

Defining the upper limit for the level of the streaming buffer may involve defining a fast playback condition. The fast playback condition may depend on the level of the streaming buffer at time t, how much media data was added to the streaming buffer between time t and time t+T, a target level for the streaming buffer, and other factors. An upper margin may be provided for the streaming buffer. Some exemplary formulas for the fast playback condition will be discussed below.

Monitoring the level of the streaming buffer to determine whether the level of the streaming buffer is above the upper limit may involve determining the level of the streaming buffer at time t, determining how much media data is added to the streaming buffer between time t and time t+T, and evaluating the fast playback condition. Setting the playback rate at a value that is greater than the intended playback rate may involve multiplying the intended playback rate by a scaling factor that is greater than one. The scaling factor may depend on the level of the streaming buffer at time t, how much media data was added to the streaming buffer between time t and time t+T, a target level for the streaming buffer, and other factors. Some exemplary formulas for calculating the scaling factor will be discussed below.

The level of the streaming buffer may be monitored periodically. The method may involve ensuring that the playback rate does not decrease below a defined minimum value. The method may involve ensuring that the playback rate does not increase above a defined maximum value. The method may be implemented by a streaming client that is in wireless communication with the streaming server.

A non-transitory computer readable storage medium comprising executable instructions for implementing a method for reducing effects of network and other variations in network bandwidth on playback of media being streamed from a streaming server is also disclosed. In accordance with the method, a lower limit may be defined for a level of a streaming buffer. A media stream may be received from a streaming media server as a stream of media data. The media stream may be played back from the streaming buffer at a playback rate. The level of the streaming buffer may be monitored during the playback of the media file to determine whether the level of the streaming buffer is below the lower limit. If it is determined that the level of the streaming buffer is below the lower limit, the playback rate may be set at a value that is less than an intended playback rate for the media stream. The value of the set playback rate may depend on the level of the streaming buffer.

A client device that is configured to reduce effects of network and other variations on playback of media that is being streamed from a streaming server is also disclosed. The client device may include a processor and memory in electronic communication with the processor. Instructions may be stored in the memory. The instructions may be executable to define a lower limit for a level of a streaming buffer. The instructions may also be executable to receive media from a streaming media server as a stream of media data. The instructions may also be executable to play back the media stream from the streaming buffer at a playback rate. The instructions may also be executable to monitor the level of the streaming buffer during the playback of the media stream to determine whether the level of the streaming buffer is below the lower limit. If it is determined that the level of the streaming buffer is below the lower limit, the instructions may also be executable to set the playback rate at a value that is less than an intended playback rate for the media stream. The value of the playback rate may depend on the level of the streaming buffer.

Various embodiments of the invention are now described with reference to the Figures, where like reference numbers indicate identical or functionally similar elements. The embodiments of the present invention, as generally described and illustrated in the Figures herein, could be arranged and designed in a wide variety of different configurations. Thus, the following more detailed description of several exemplary embodiments of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments.

Many features of the embodiments disclosed herein may be implemented as computer software, electronic hardware, or combinations of both. To clearly illustrate this interchangeability of hardware and software, various components will be described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Where the described functionality is implemented as computer software, such software may include any type of computer instruction or computer executable code located within a memory device and/or transmitted as electronic signals over a system bus or network. Software that implements the functionality associated with components described herein may comprise a single instruction, or many instructions, and may be distributed over several different code segments, among different programs, and across several memory devices.

As used herein, the terms "an embodiment", "embodiment", "embodiments", "the embodiment", "the embodiments", "one or more embodiments", "some embodiments", "certain embodiments", "one embodiment, "another embodiment" and the like mean "one or more (but not necessarily all) embodiments of the disclosed invention(s)", unless expressly specified otherwise.

The term "determining" (and grammatical variants thereof) is used in an extremely broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

The phrase "based on" does not mean "based only on," unless expressly specified otherwise. In other words, the phrase "based on" describes both "based only on" and "based at least on."

FIG. 1 illustrates a system 100 in which embodiments may be practiced. The system 100 includes a server device 102 and a client device 104. The server device 102 and the client device 104 may be in electronic communication over a computer network (not shown).

The server device 102 includes a streaming server 106. As discussed above, the streaming server 106 is a software program that is capable of providing a media file 108 (or, alternatively, a live stream 107 from a camera, encoder, etc.) to a client program as a stream of media data. The streaming server 106 may be a specialized program for performing audio/video streaming tasks. Alternatively, the streaming server 106 may be a conventional web server.

The client device 104 includes a streaming client 110. As discussed above, the streaming client 110 is a software program that allows a user to play a media file 108 that is being streamed from the streaming server 106. The streaming client 110 may be a standalone application, or it may be integrated into another application. For example, the streaming client 110 may be a plug-in for a web browser.

During typical operation, a user of the client device 104 provides input to the streaming client 110 which initiates playback of a media file 108. In response to this user input, the streaming client 110 sends a request to the streaming server 106 to begin streaming the desired media file 108. In response to this request, the streaming server 106 sends the media file 108 to the streaming client 110 as a data stream. As media data is received by the streaming client 110, it is stored in a streaming buffer 112. Once the streaming buffer 112 is filled to a defined level, the streaming client 110 begins playing back the media file 108 from the streaming buffer 112. Typically, playback of the media file 108 begins before the entire media file 108 is downloaded to the client device 104.

Figure 2:
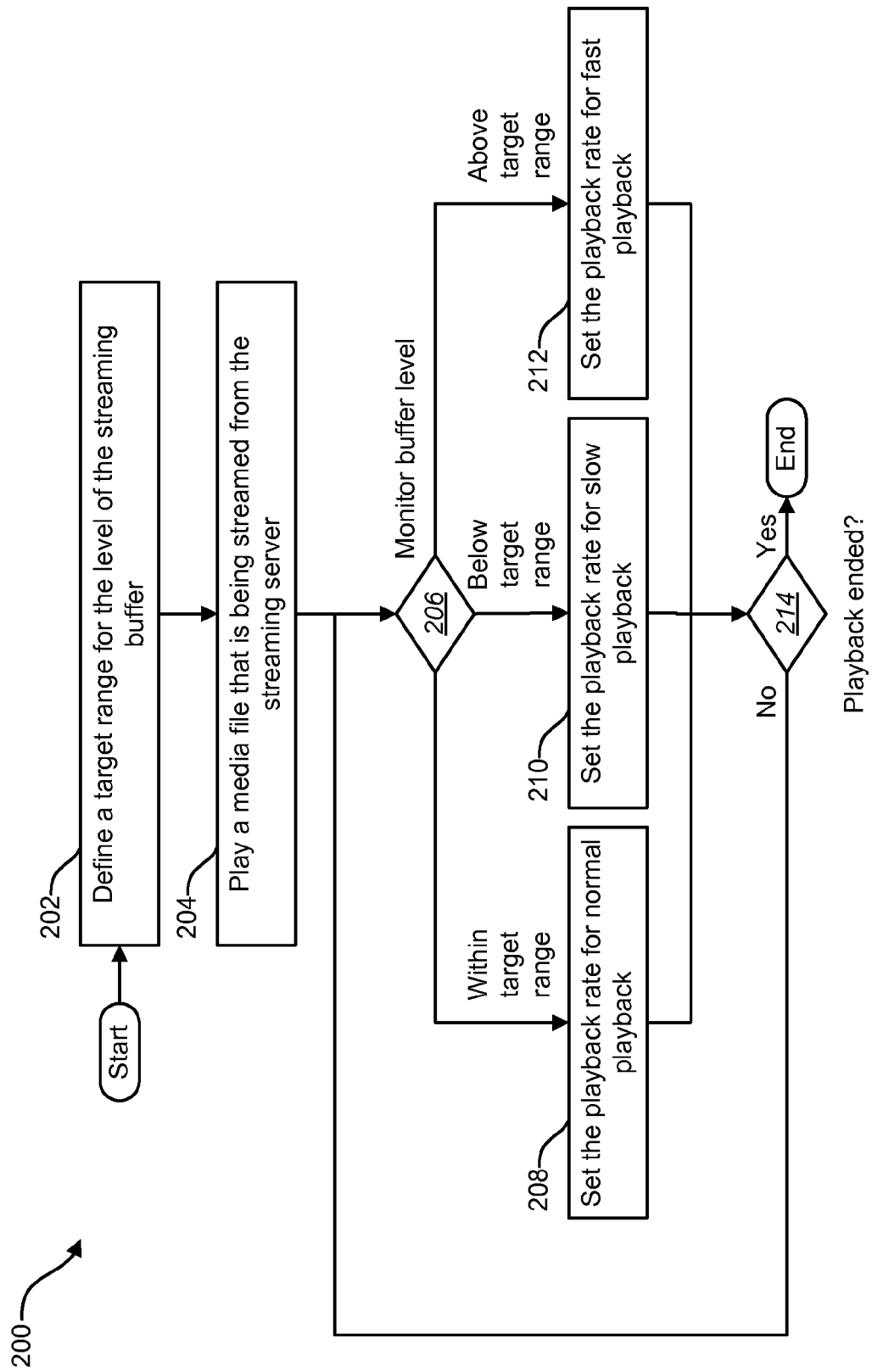
FIG. 2 illustrates an embodiment of a method for reducing the effects of variations in network bandwidth on the playback of streaming media.

FIG. 2 illustrates an embodiment of a method 200 for reducing the effects of variations in network bandwidth on the playback of streaming media. The depicted method 200 may be implemented by the streaming client 110 in the system 100 that is shown in FIG. 1.

In accordance with the depicted method 200, a target range for the level of the streaming buffer 112 is defined 202. In this context, the "level" of the streaming buffer 112 refers to the extent to which the streaming buffer 112 is filled with media data. In the depicted embodiment, the target range includes an upper limit and a lower limit for the streaming buffer 112. As will be made clear from the discussion that follows, it is intended that the level of the streaming buffer 112 will stay within the target range during the playback of a streaming media file 108. However, if the level of the streaming buffer 112 varies outside this range, then the rate at which the media file 108 is played back (which is known as the "playback rate," "playout rate," "playback speed," and/or "playout speed") is adjusted.

Before continuing with the description of the method 200 of FIG. 2, a brief explanation of what it means to adjust the playback rate of a media file 108 will be provided. Typically, a media file 108 has a certain playback rate associated with it. This playback rate will be referred to as the intended playback rate. The playback rate of an audio-video file may be expressed in frames/second. If the intended playback rate of a particular audio-video file is N frames/second, this means that N frames of the audio-video file are supposed to be displayed each second. This may be referred to as "normal playback." Decreasing the playback rate below the intended playback rate results in fewer than N frames/second being displayed. This may be referred to as "slow playback." Conversely, increasing the playback rate above the intended playback rate results in more than N frames/second being displayed. This may be referred to as "fast playback." In general audio and video may have different values for N for normal playback. For example, N=30 frames per second for video and N=44.1 kilo-samples per second for audio.

Returning to the method 200 of FIG. 2, as the streaming client 110 is playing 204 a media file 108 that is being streamed from the streaming server 106, the level of the streaming buffer 112 is monitored 206. In some embodiments, the level of the streaming buffer 112 may be monitored periodically. In this context, the term "periodically" means occurring from time to time, and not necessarily at regular intervals. In other embodiments, the level of the streaming buffer 112 may be monitored continuously. As long as it is determined 206 that the level of the streaming buffer 112 is within the defined target range, then the streaming client 110 sets 208 the playback rate at a value that corresponds to normal playback. In other words, the playback rate is set equal to the intended playback rate for the media file 108.

However, if it is determined 206 that the level of the streaming buffer 112 is below the lower limit of the target range, then the streaming client 110 sets 210 the playback rate for slow playback. In other words, the playback rate is set equal to a value that is less than the intended playback rate for the media file 108. The specific value of the playback rate depends on the level of the streaming buffer 112, and/or the data that was received in the previous few time segments, and/or the data that is estimated to be received in future time segments. Typically, the lower the level of the streaming buffer 112, the slower the playback rate.

Similarly, if it is determined 206 that the level of the streaming buffer 112 is above the upper limit of the target range, then the streaming client 110 sets 212 the playback rate for fast playback. In other words, the playback rate is set equal to a value that is greater than the intended playback rate for the media file 108. Again, the specific value of the playback rate depends on the level of streaming buffer 112, and/or the data that was received in the previous few time segments, and/or the data that is estimated to be received in future time segments. Typically, the higher the level of the streaming buffer 112, the faster the playback rate.

The streaming client 110 may repeatedly monitor 206 the level of the streaming buffer 112 and adjust the playback rate of the media file 108 as discussed above until it is determined 214 that playback of the media file 108 has ended. When this occurs, the method 200 ends.

A brief discussion of various alternatives to the method 200 of FIG. 2 will now be provided. In accordance with one alternative embodiment, if the size of the streaming buffer 112 can grow, then the streaming client 110 may be configured so that fast playback is not utilized under any circumstances. In such an embodiment, instead of defining a target range for the level of the streaming buffer 112, the streaming client 110 may only define a lower limit. If the level of the streaming buffer 112 falls below the lower limit, then the streaming client 110 may set the playback rate at a value that is less than the intended playback rate for the media file 108 (i.e., slow playback). Otherwise, in such an embodiment the streaming client 110 would set the playback rate equal to the intended playback rate for the media file 108 (i.e., normal playback), regardless of how high the level of the streaming buffer 112 becomes.

In accordance with another alternative embodiment, a minimum value and/or a maximum value may be defined for the playback rate. In such an embodiment, the streaming client 110 may be configured to ensure that the playback rate does not decrease below the defined minimum value, or increase above the defined maximum value. In other words, the streaming client 110 may be configured so that it does not ever play back a media file 108 at a playback rate that is less than the defined minimum value for the playback rate, regardless of how low the level of the streaming buffer 112 becomes. Similarly, the streaming client 110 may be configured so that it does not ever play back a media file 108 at a playback rate that is greater than the defined maximum value of the playback rate, regardless of how high the level of the streaming buffer 112 becomes. In some embodiments, these values may be set based on user perception of an "acceptable" slow/fast playback rate and/or based on the type of content being played back.

Figure 3:
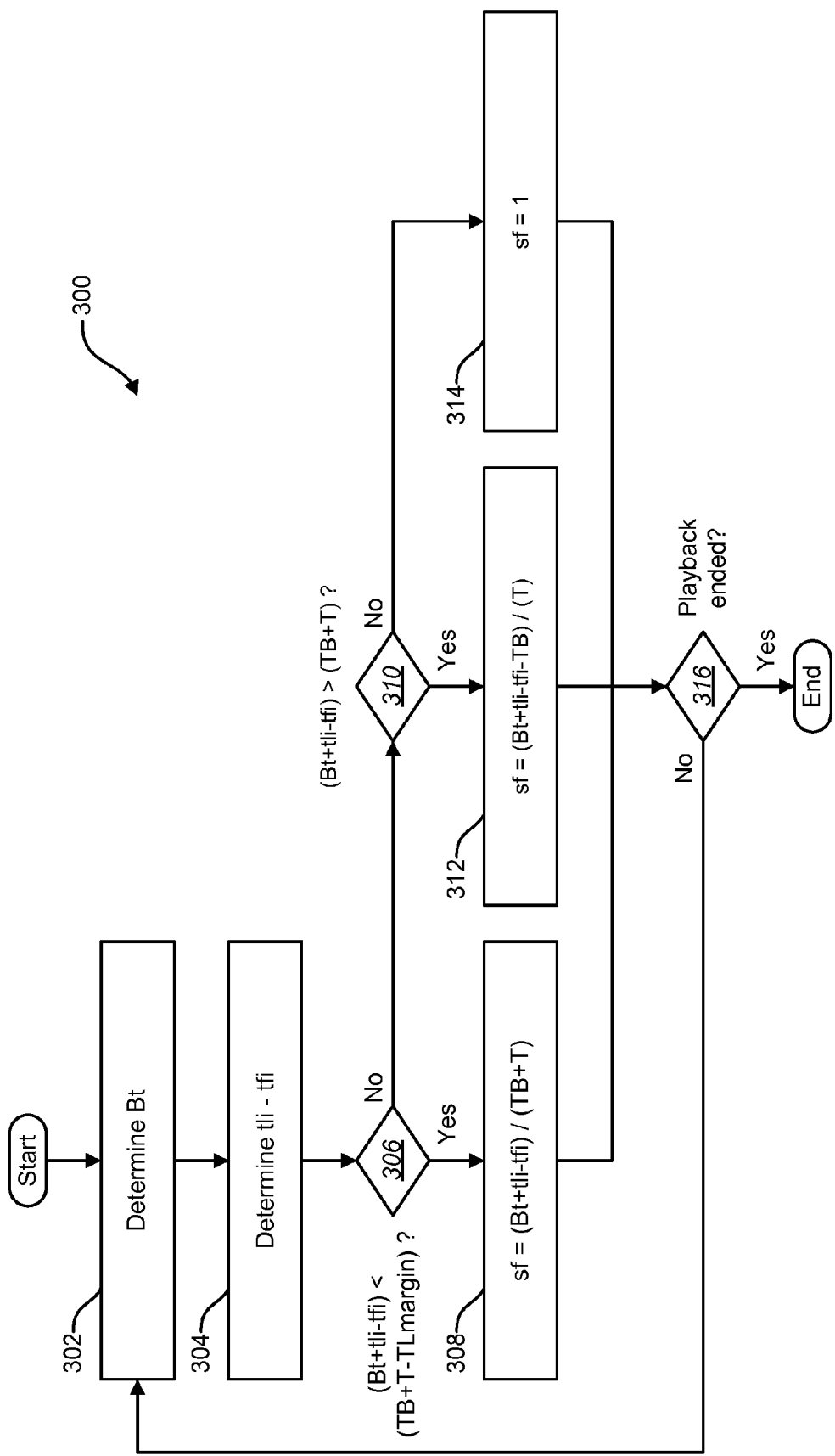
FIG. 3 illustrates another embodiment of a method for reducing the effects of variations in network bandwidth on the playback of streaming media.

FIG. 3 illustrates another embodiment of a method 300 for reducing the effects of variations in network bandwidth on the playback of streaming media. This method 300 can be thought of as a more specific implementation of the method 200 that is shown in FIG. 2.

In the method 300 of FIG. 3, adjusting the playback rate of a media file 108 involves multiplying the intended playback rate by a scaling factor. If the scaling factor is greater than one, this corresponds to fast playback. The larger the scaling factor, the faster the playback rate. Conversely, if the scaling factor is less than one, this corresponds to slow playback. The smaller the scaling factor, the slower the playback rate.

The method 300 that is depicted in FIG. 3 begins by determining 302 the amount of media data that is stored in the streaming buffer 112 (i.e., the level of the streaming buffer 112). The point in time at which this determination is made will be referred to as time t. The amount of media data that is stored in the streaming buffer 112 at time t will be referred to as B(t). The term B(t) is expressed in time units.

The amount of media data that is received from the streaming server 106 and added to the streaming buffer 112 over the next T time units (i.e., from time t until time t+T) is also determined 304. This value will be referred to as (tli−tfi). The term (tli−tfi) is also expressed in time units.

At the end of the T time units, the streaming client 110 makes a determination about whether it should utilize slow playback, fast playback, or normal playback. Initially, the streaming client 110 evaluates 306 a condition which, if satisfied, means that slow playback should be utilized. This condition, which will be referred to as the slow playback condition, is expressed in equation 1 below:

$$(B(t)+tli-tfi) < (B^{Target} + T - B_L^{margin}) \quad (1)$$

In equation 1, the term $B^{Target}$ is a target level for the streaming buffer 112, expressed in time units. The term $B_L^{margin}$ is a margin for the streaming buffer 112, also expressed in time units.

If the slow playback condition is satisfied, then the streaming client 110 adjusts 308 the scaling factor to a value that is less than one (i.e., slow playback). The specific value of the scaling factor is calculated 308 according to equation 2 below (the term sf is the scaling factor):

$$sf = (B(t)+tli-tfi)/(B^{Target}+T) \quad (2)$$

If the slow playback condition is not satisfied, then the streaming client 110 evaluates 310 another condition which, if satisfied, means that fast playback should be utilized. This condition, which will be referred to as the fast playback condition, is expressed in equation 3 below:

$$(B(t)+tli-tfi) > (B^{Target}+T) \quad (3)$$

If the fast playback condition is satisfied, then the streaming client 110 adjusts 312 the scaling factor to a value that is greater than one (i.e., fast playback). The specific value of the scaling factor is calculated 312 according to equation 4 below (again, the term sf is the scaling factor):

$$sf = (B(t)+tli-tfi-B^{Target})/(T) \quad (4)$$

If neither the fast playback condition nor the slow playback condition are satisfied, this means that normal playback should be utilized. Thus, the streaming client 110 sets 314 the value of the scaling factor equal to one. Once the scaling factor has been determined, then the intended playback rate is multiplied by the scaling factor that is calculated. The method 300 is then repeated. This continues until it is determined 316 that playback of the media file 108 has ended, at which point the method 300 ends.

As mentioned, the method 300 of FIG. 3 may be thought of as a more specific implementation of the method 200 that is shown in FIG. 2. A brief explanation will now be provided about how the method 300 of FIG. 3 implements the method 200 of FIG. 2.

The method 200 of FIG. 2 involves defining 202 a target range for the level of the streaming buffer 112. The target range includes a defined lower limit and a defined upper limit. In the method 300 of FIG. 3, this is accomplished by defining a slow playback condition and a fast playback condition.

The method 200 of FIG. 2 also involves monitoring 206 the level of the streaming buffer 112 to determine whether it is within the target range. In the method 300 of FIG. 3, this is accomplished by determining 302 B(t), determining 304 (tli−tfi), evaluating 306 the slow playback condition, and evaluating 308 the fast playback condition.

The method 200 of FIG. 2 also involves setting 208 the playback rate of the media file 108 at a value that corresponds to normal playback if the level of the streaming buffer 112 is within the target range. In the method 300 of FIG. 3, the level of the streaming buffer 112 is within the target range if neither the slow playback condition nor the fast playback condition are satisfied. If neither the slow playback condition nor the fast playback condition are satisfied, the scaling factor is set 314 equal to one.

The method 200 of FIG. 2 also involves playing back 208 the media file 108 at a playback rate that corresponds to slow playback if the level of the streaming buffer 112 is below the lower limit of the target range. In the method 300 of FIG. 3, the level of the streaming buffer 112 is below the lower limit of the target range if the slow playback condition is satisfied. If the slow playback condition is satisfied, the scaling factor is calculated using an equation that is defined for slow playback (i.e., equation 2), and the intended playback rate is multiplied by the scaling factor that is calculated.

The method 200 of FIG. 2 also involves playing back 208 the media file 108 at a playback rate that corresponds to fast playback if the level of the streaming buffer 112 is above the upper limit of the target range. In the method 300 of FIG. 3, the level of the streaming buffer 112 is above the upper limit of the target range if the fast playback condition is satisfied. If the fast playback condition is satisfied, the scaling factor is calculated using an equation that is defined for fast playback (i.e., equation 4), and the intended playback rate is multiplied by the scaling factor that is calculated.

A brief discussion of various alternatives to the method 300 of FIG. 3 will now be provided. In the method 300 shown in FIG. 3, a decision is made every T time units about whether to utilize normal playback, slow playback, or fast playback. In an alternative embodiment, the value of T may be adjusted. For example, the value of T may be set relatively high when significant fluctuations in available network bandwidth are not anticipated, and relatively low when such fluctuations are expected. In some embodiments, the value for T may be varied and may not be constant.

In accordance with another alternative embodiment, a small constant buffer margin may be added to the fast playback condition. In particular, the fast playback condition may be expressed as:

$$(B(t)+tli-tfi)>(B^{Target}+T+B_U^{margin}) \quad (5)$$

In equation 5, the term $B_U^{margin}$ is a margin for the streaming buffer 112, expressed in time units.

If the fast playback condition is as shown in equation 5, then the specific value of the scaling factor may be calculated using equation 6:

$$sf=(B(t)+tli-tfi)/(B^{Target}+n*T) \quad (6)$$

In equation 6, the term n is an integer that is greater than or equal to zero. As will be discussed in greater detail below, the alternative embodiment that is represented by equations 5 and 6 may allow a smoother transition to normal playback than the method 300 of FIG. 3.

In accordance with another alternative embodiment, the amount of media data that is to be received over the next T time units may be estimated (e.g. based on the amount of media data received in the past few durations of T time units) and this estimate may be used to calculate the scaling factor (sf) using equation 7:

$$sf=(B(t)+tli-tfi+tE)/(B^{Target}+2*T) \quad (7)$$

In equation 7, the term tE is the amount of media data that is estimated to be received over the next T time units, i.e., during time [t+T, t+2T). A very conservative method may set tE=0.

Figure 3A:
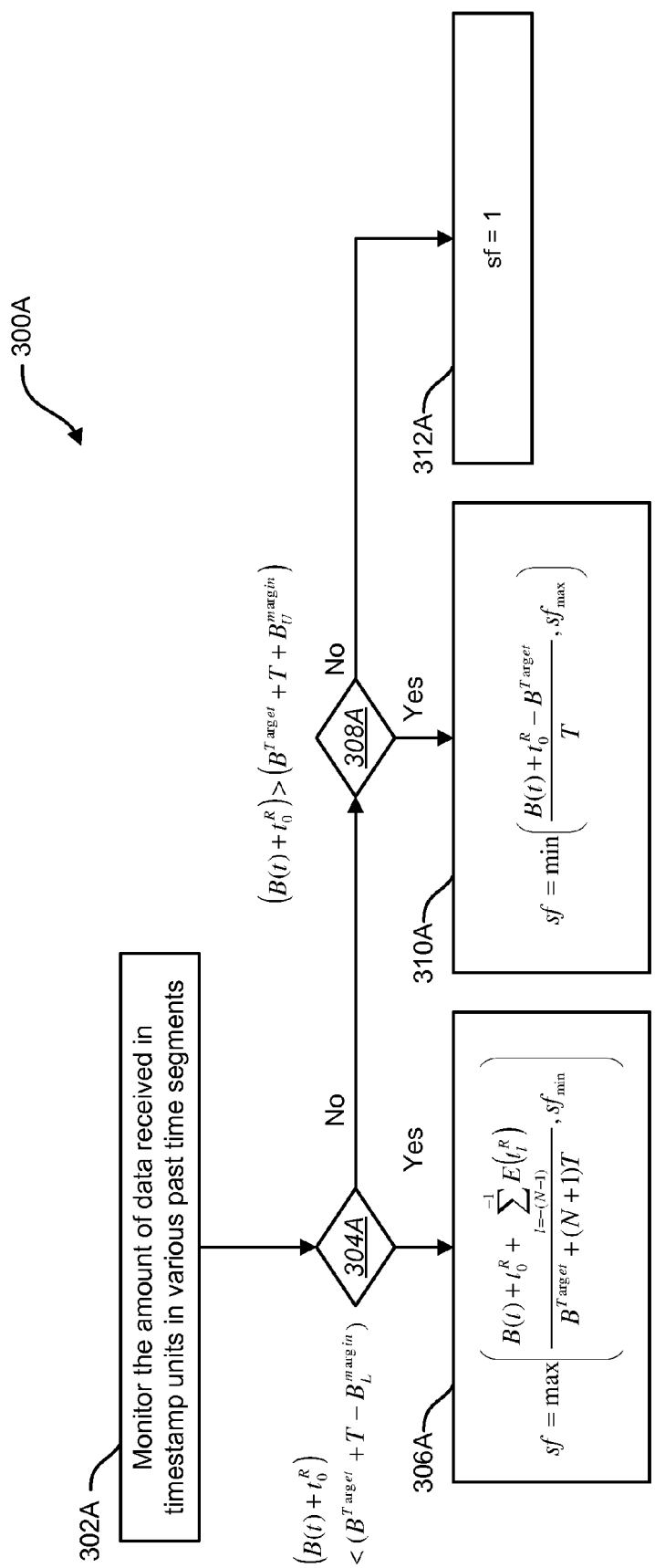
FIG. 3A illustrates another embodiment of a method for reducing the effects of variations in network bandwidth on the playback of streaming media.

FIG. 3A illustrates another embodiment of a method 300A for reducing the effects of variations in network bandwidth on the playback of streaming media. In accordance with the method 300A of FIG. 3A, the amount of data received in timestamp units in various past time segments is monitored 302A. In the discussion that follows, the term T indicates a time segment, the term t indicates the current time, and the term $t_k^R$ indicates the data received in timestamp units at the receiver (the streaming client 110) in the previous $k^{th}$ time segment, i.e., during the time [t−kT,t−(k−1)T).

The streaming client 110 evaluates 304A a condition which, if satisfied, means that slow playback should be utilized. This condition, which will be referred to as the slow playback condition, is expressed in equation 8 below:

$$(B(t)+t_0^R)<(B^{Target}+T-B_L^{margin}) \quad (8)$$

In equation 8, the term B(t) refers to the amount of data stored in the buffer 112 in time units at time t. The term $B^{Target}$ refers to the target buffer level in time units. The term $B_L^{margin}$ is a small buffer margin in time units to prevent AMP due to very short term variation in the buffer levels.

If the slow playback condition is satisfied, then the streaming client 110 adjusts 306A the scaling factor to a value that is less than one (i.e., slow playback). The specific value of the scaling factor is calculated 306A according to equation 9 below (the term sf is the scaling factor):

$$sf = \max\left(\frac{B(t) + t_0^R + \sum_{l=-(N-1)}^{-1} E(t_l^R)}{B^{Target} + (N+1)T}, sf_{min}\right) \quad (9)$$

In equation 9, the term $E(t_l^R)$ indicates the estimated amount of data that will be received in timestamp units at the receiver (the streaming client 110) in the next $l^{th}$ time segment, i.e., during the time [t−lT,t−(l−1)T), where l=−1, ..., −(N−1). The term $sf_{min}$ refers to the minimum scale factor.

If it is determined 304A that the slow playback condition is not satisfied, then the streaming client 110 evaluates 308A another condition which, if satisfied, means that fast playback should be utilized. This condition, which will be referred to as the fast playback condition, is expressed in equation 10 below:

$$(B(t)+t_0^R)>(B^{Target}+T+B_U^{margin}) \quad (10)$$

In equation 10, the term $B_U^{margin}$ is a small buffer margin in time units, which may be set based on the value for $B^{Target}$ and the size of the buffer 112.

If it is determined 308A that the fast playback condition is satisfied, then the streaming client 110 adjusts 310A the scaling factor to a value that is greater than one (i.e., fast playback). The specific value of the scaling factor is calculated 310A according to equation 11 below (the term sf is the scaling factor):

$$sf = \min\left(\frac{B(t) + t_0^R - B^{Target}}{T}, sf_{max}\right) \quad (11)$$

In equation 11, the term $sf_{max}$ is the maximum scale factor. Equation 11 does not use an upper buffer margin. Alternatively, the value of the scaling factor may be calculated according to equation 12, which uses an upper buffer margin.

$$sf = \min\left(\frac{B(t) + t_0^R}{B^{Target} + nT}, sf_{max}\right) \quad (11)$$

If neither the fast playback condition nor the slow playback condition are satisfied, this means that normal playback should be utilized. Thus, the streaming client 110 sets 312A the value of the scaling factor equal to one. Once the scaling factor has been determined, then the intended playback rate is multiplied by the scaling factor that is calculated.

In some embodiments a hysteresis type of behavior can be applied during the decision process where the slow playback may be continued (if currently doing slow playback) until the buffer level comes back to at or slightly above the target buffer level.

Figure 4:
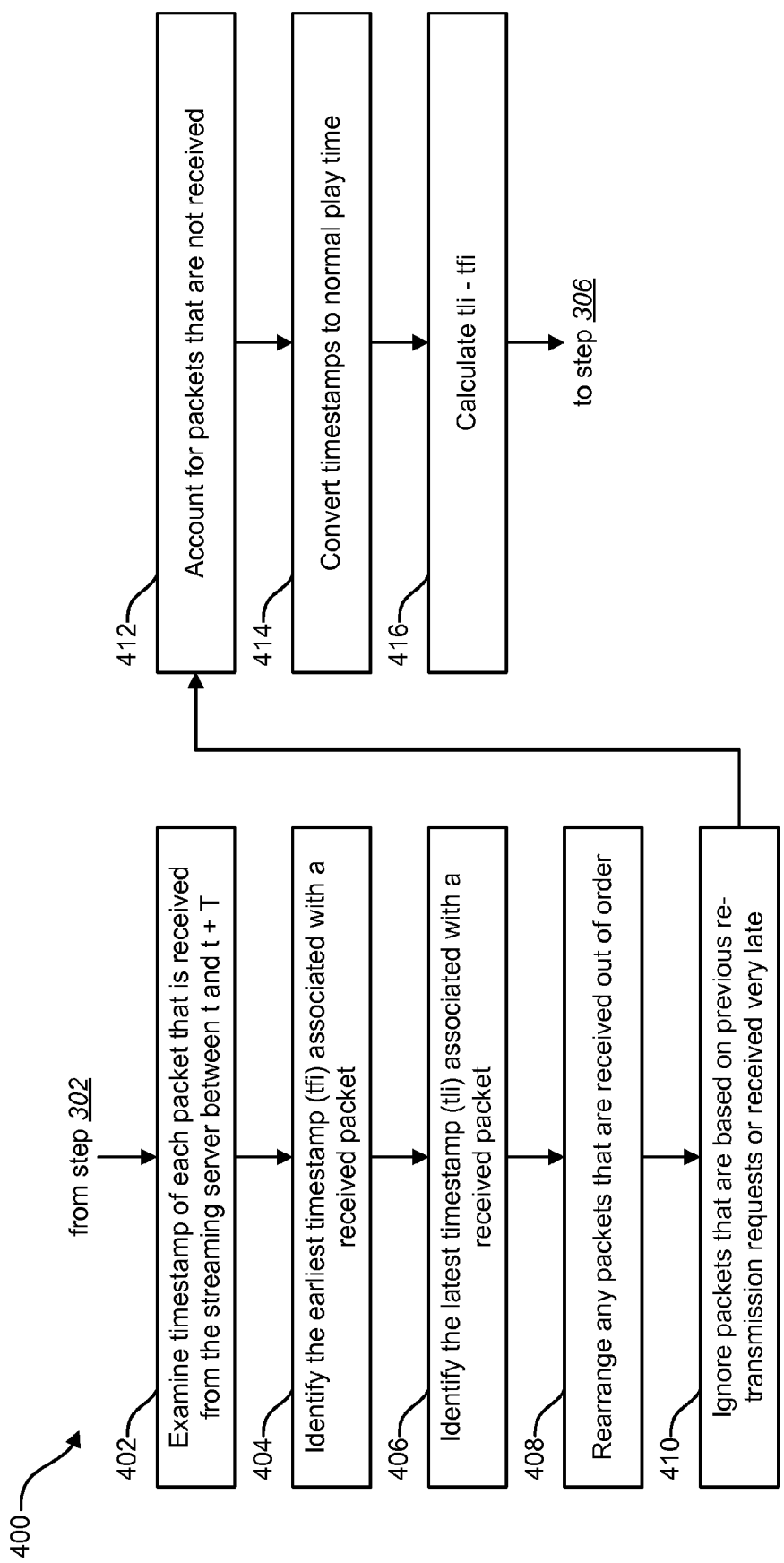
FIG. 4 illustrates an exemplary method for determining the amount of media data that is received from the streaming server and added to the streaming buffer over T time units.

As discussed above, the method 300 that is shown in FIG. 3 involves determining 304 the amount of media data that is received from the streaming server 106 and added to the streaming buffer 112 over the next T time units (i.e., from time t until time t+T). FIG. 4 illustrates an exemplary method 400 for performing this step.

In accordance with the depicted method 400, the streaming client 110 examines 402 the timestamp of each packet that it receives from the streaming server 106 between time t and time t+T. The streaming client 110 identifies 404 the earliest timestamp that is associated with a packet that is received during this time. The earliest timestamp will be referred to as tfi. The streaming client 110 also identifies 406 the latest timestamp that is associated with a packet that is received during this time. The latest timestamp will be referred to as tli.

For purposes of identifying 404 the earliest timestamp (tfi) and identifying 406 the latest timestamp (tli), the streaming client 110 may rearrange 408 any packets that are received out of order, ignore 410 packets that are based on previous re-transmission requests (for lost packets) or that are received very late, and account 412 for packets that are not received. In addition, the timestamps may be converted 414 to normal play time on the timeline.

Once the earliest timestamp (tfi) and the latest timestamp (tli) are identified 404, 406 the amount of media data that is received from the streaming server 106 and added to the streaming buffer 112 from time t until time t+T may be determined by calculating 416 the difference between tli and tfi. This value may then be utilized as discussed above in connection with FIG. 3.

Figure 5:
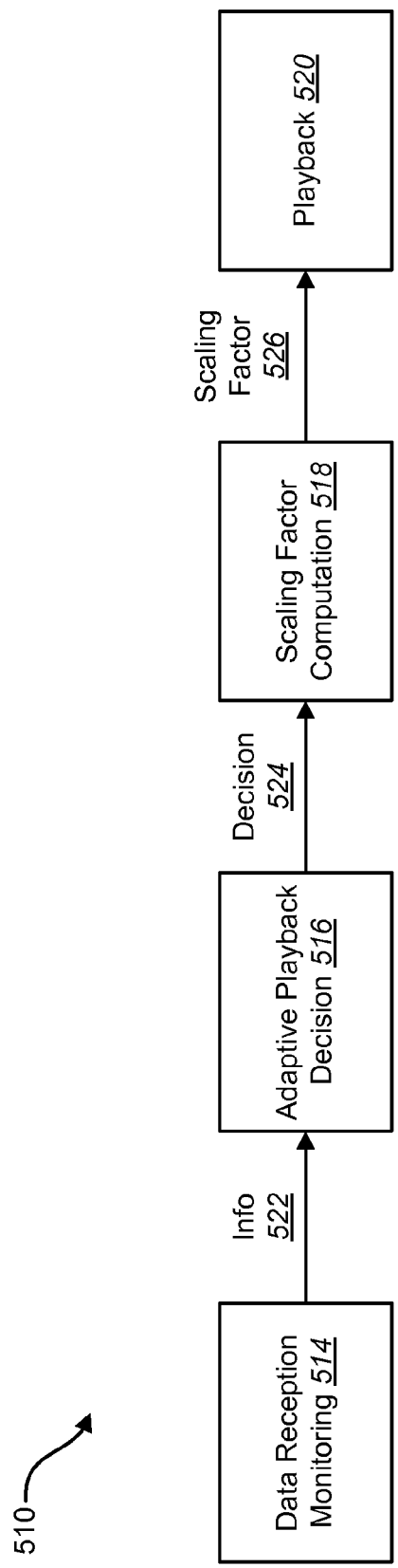
FIG. 5 illustrates components that may be provided within a streaming client in order to implement the method of FIG. 3.

FIG. 5 illustrates components that may be provided within a streaming client 510 in order to implement the method 300 of FIG. 3. A data reception monitoring component 514, an adaptive playback decision component 516, a scaling factor computation component 518, and a playback component 520 are provided.

In accordance with the depicted embodiment, the data reception monitoring component 514 determines 302 the amount of media data that is stored in the streaming buffer 112 at a particular point in time (time t). The data reception monitoring component 514 also determines 304 the amount of media data that is received from the streaming server 106 and added to the streaming buffer 112 over the previous and/or next time segments of T time units. The data reception monitoring component 514 may also estimate the amount of data that will be received over future time segments, e.g., based on the past and/or current data reception history. The data reception monitoring component 514 may provide this information 522 to the adaptive playback decision component 516.

The adaptive playback decision component 516 uses the information 522 that it receives from the data reception monitoring component 514 to make a decision 524 about whether slow playback, fast playback, or normal playback should be utilized. In particular, the adaptive playback decision component 516 evaluates 306 the slow playback condition (e.g., equation 1 above). If the slow playback condition is satisfied, then the decision 524 is to utilize slow playback. If the slow playback condition is not satisfied, then the adaptive playback decision component 516 evaluates 308 the fast playback condition (e.g., equation 3 above). If the fast playback condition is satisfied, then the decision 524 is to utilize fast playback. If neither the slow playback condition nor the fast playback condition are satisfied, then the decision 524 is to utilize normal playback. The adaptive playback decision component 516 provides its decision 524 to the scaling factor computation component 518.

The scaling factor computation component 518 calculates the scaling factor 526 based on the decision 524 that it receives from the adaptive playback decision component 516. If the decision 524 is to utilize slow playback, then the scaling factor computation component 518 calculates the scaling factor 526 using an equation that is defined for slow playback (e.g., equation 2 above). If the decision 524 is to utilize fast playback, then the scaling factor computation component 518 calculates the scaling factor 526 using an equation that is defined for fast playback (e.g., equation 6 above). If the decision 524 is to utilize normal playback, then the scaling factor computation component 518 sets the scaling factor 526 equal to one.

The scaling factor computation component 518 provides the scaling factor 526 that it calculates to the playback component 520. The playback component 520 plays back the media file 108 at a playback rate that is determined by multiplying the intended playback rate for the media file 108 by the scaling factor 526.

Of course, the components that are illustrated in FIG. 5 are exemplary only. The functionality that is performed by distinct components in FIG. 5 may, in an alternative embodiment, be performed by a single component. Also, the functionality that is performed by a single component in FIG. 5 may be performed by multiple components.

A simulation of the method 300 shown in FIG. 3 was performed. For the simulation, an NS2 network simulator was used to simulate a wireless channel with bandwidth variation. The NS2 scenario consisted of four wireless network nodes, which will be referred to as node 0, node 1, node 2, and node 3. It was simulated that a CBR source (UDP) on node 0 streamed a media file to node 1. Streaming started at t=1 second and stopped at t=121 seconds. The CBR source had a bit-rate of 3 Mbps and a packet size of 1000 bytes. A small amount of cross-traffic was simulated between the other two nodes (i.e., nodes 2 and 3). In particular, it was simulated that node 2 sent a 1 MB file to node 3, using FTP, starting at t=60 seconds.

Figure 6:
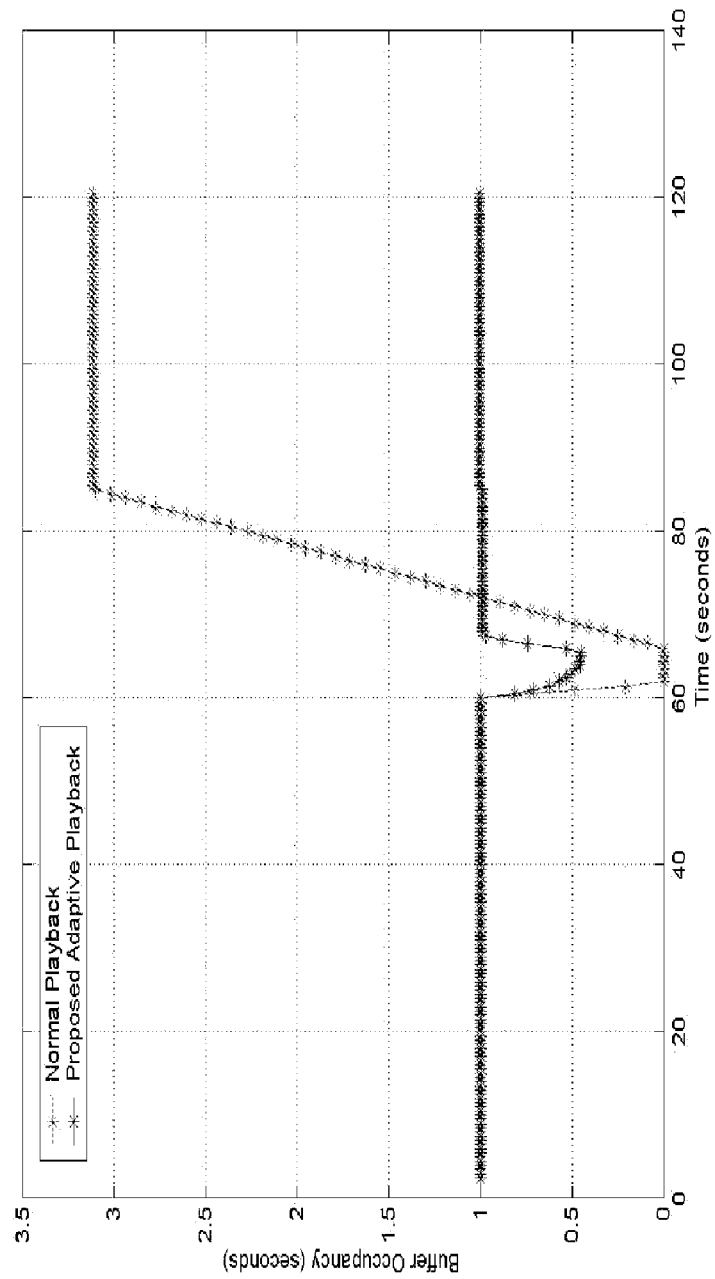
FIG. 6 shows various simulation results that were obtained during a simulation that was performed of the method of FIG. 3.
Figure 7:
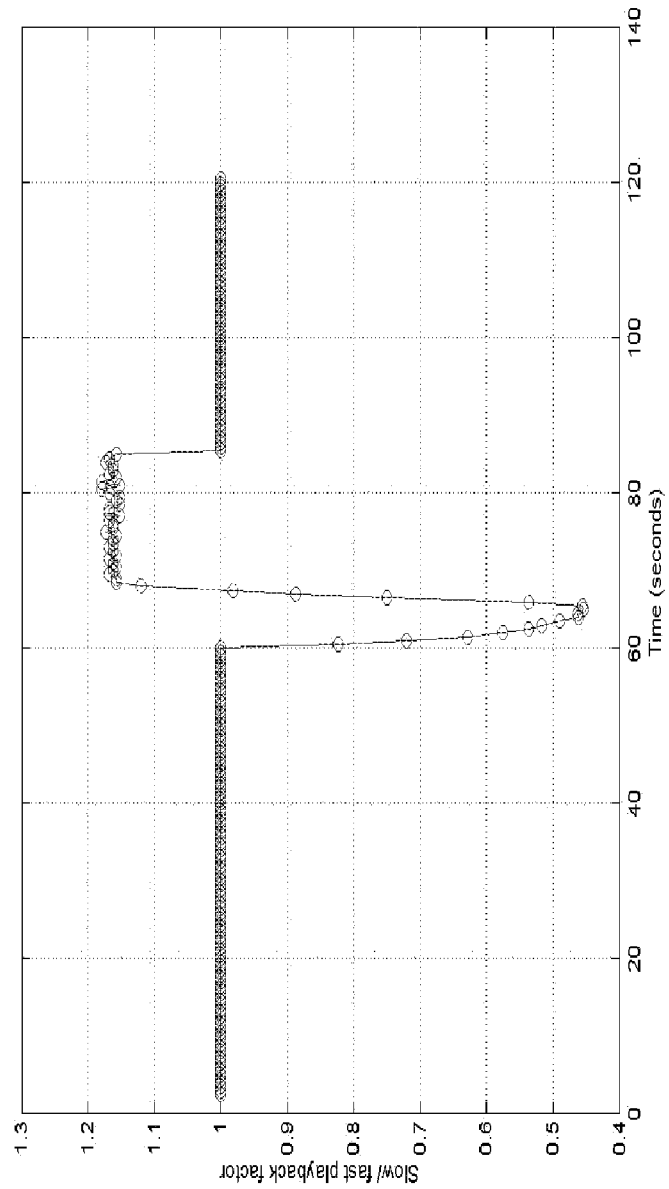
FIG. 7 shows additional simulation results that were obtained during a simulation that was performed of the method of FIG. 3.

FIG. 6 shows the level of the streaming buffer level at node 1 during the simulation when using normal playback only. For purposes of comparison, FIG. 6 also shows the level of the streaming buffer at node 1 during the simulation when using the approach described above in connection with FIG. 3. As can be seen, in this simulation using normal playback only resulted in buffer underflow, which lasted from t=62 seconds to t=66 seconds. However, the underflow was prevented in this simulation by using the method 300 of FIG. 3. FIG. 7 shows the values of the scaling factor that were calculated during the simulation.

Figure 8:
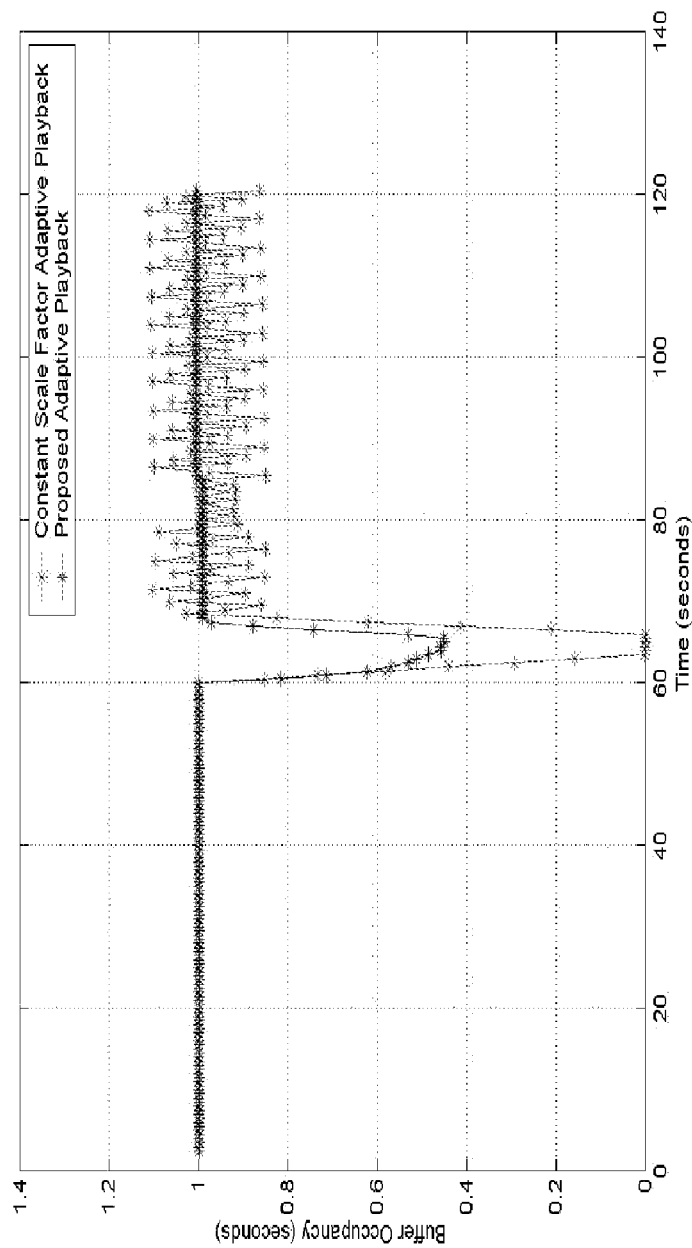
FIG. 8 shows additional simulation results that were obtained during a simulation that was performed of the method of FIG. 3.

FIG. 8 shows the level of the streaming buffer at node 1 during the simulation when a known adaptive playout technique was used. This known adaptive playout technique utilizes a constant scale factor. A constant scale factor of 1.33 was used during the simulation. For purposes of comparison, FIG. 8 also shows the level of the streaming buffer at node 1 during the simulation when using the approach described above in connection with FIG. 3. As can be seen, using a constant scale factor for adaptive playout resulted in a buffer underflow during the simulation, which occurred from t=64 seconds to t=66 seconds. Furthermore, the constant scale factor in this case also resulted in oscillations (between t=68 seconds and t=120 seconds) which can be undesirable. As discussed above, the simulation of the method 300 shown in FIG. 3 did not result in buffer underflow.

Figure 9:
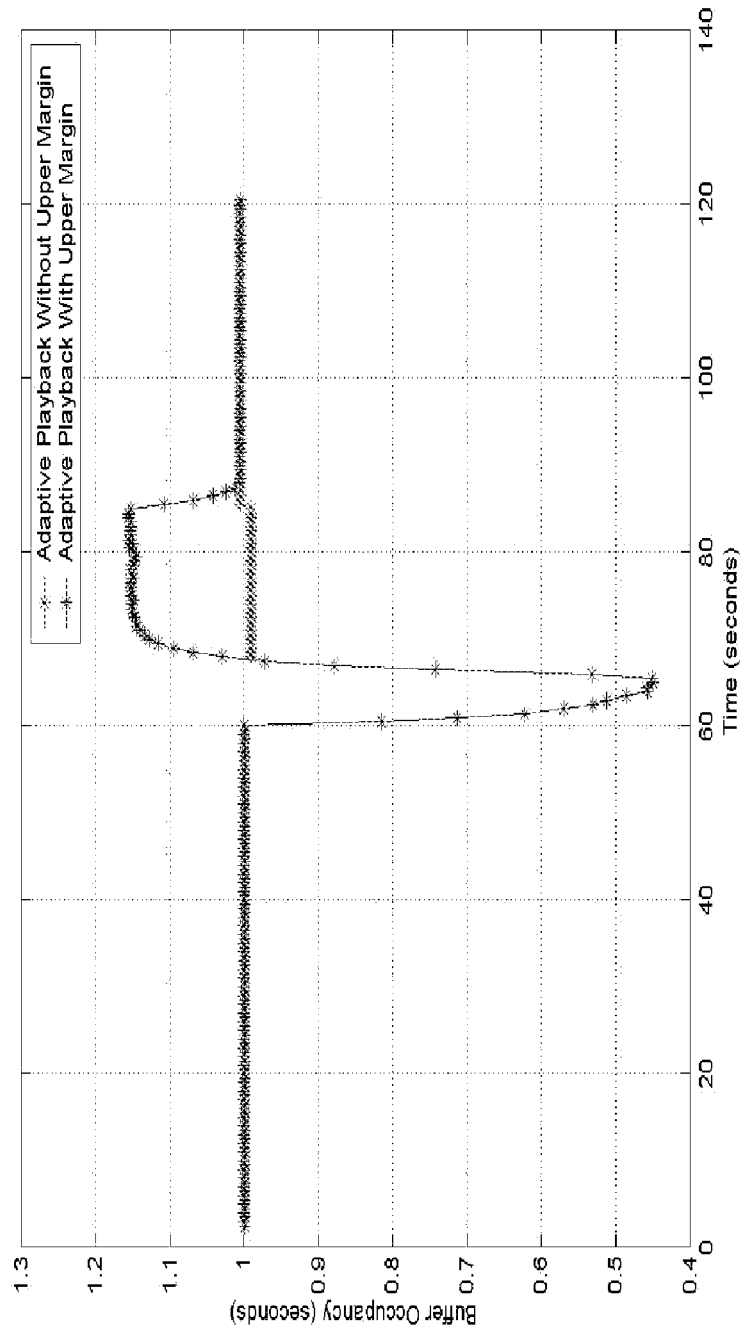
FIG. 9 shows additional simulation results that were obtained during a simulation that was performed of the method of FIG. 3.
Figure 10:
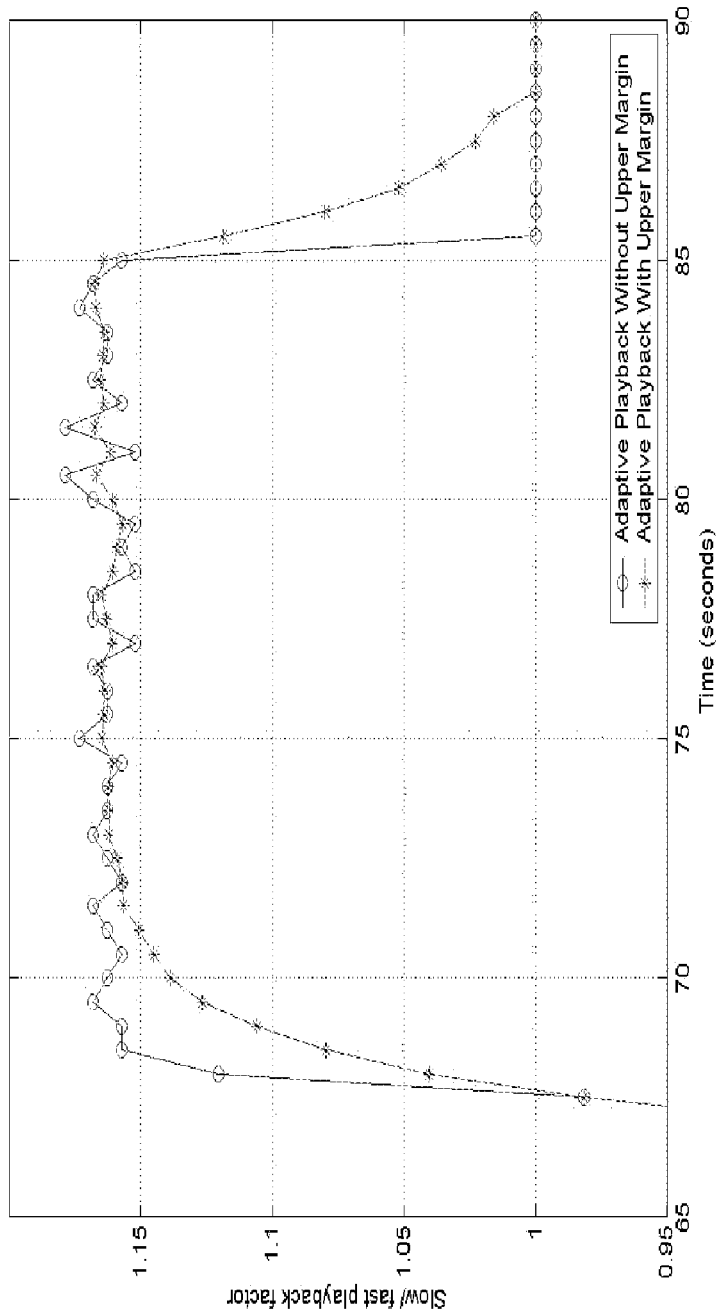
FIG. 10 shows additional simulation results that were obtained during a simulation that was performed of the method of FIG. 3.

FIGS. 9-10 show simulation results for the alternative embodiment in which a small constant buffer margin is added to the fast playback condition. This was discussed above in connection with equations 5 and 6. FIG. 9 shows the level of the streaming buffer at node 1 during the simulation when the buffer margin was not used (i.e., equation 3 was used for the fast playback condition, and equation 4 was used to calculate the scaling factor for fast playback). FIG. 9 also shows the level of the streaming buffer at node 1 during the simulation when the buffer margin was used (i.e., equation 5 was used for the fast playback condition, and equation 6 was used to calculate the scaling factor for fast playback). As can be seen, using the buffer margin resulted in a smoother transition from fast playback to normal playback (and vice versa) as compared to a more abrupt transition when the buffer margin was not used. Also, using the buffer margin resulted in an increased streaming buffer level (from t=68 to t=88 seconds).

FIG. 10 shows the scaling factors that were computed during the simulation when the buffer margin was used. FIG. 10 also shows the scaling factors that were computed during the simulation when the buffer margin was not used. The graphs in FIG. 10 show values for the scaling factor that are greater than one (which correspond to fast playback).

Figure 11:
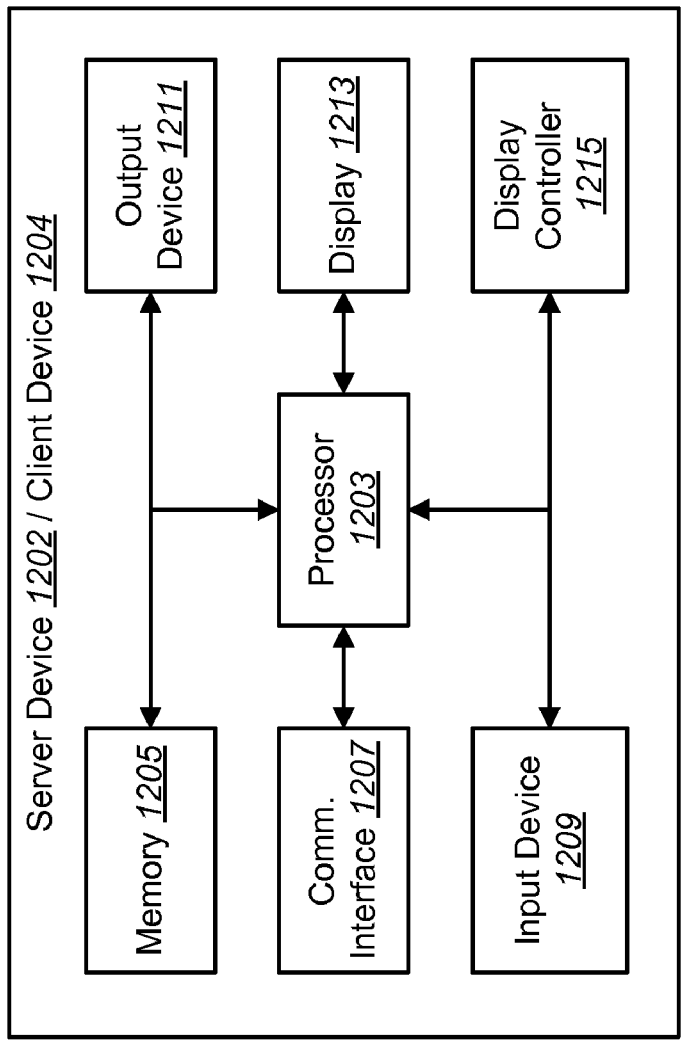
FIG. 11 illustrates various components that may be utilized in a server device and/or a client device.

FIG. 11 illustrates various components that may be utilized in a server device 1202 and/or a client device 1204. The illustrated components may be located within the same physical structure or in separate housings or structures.

The server device 1202 and/or client device 1204 includes a processor 1203 and memory 1205. The processor 1203 controls the operation of the server device 1202 and/or client device 1204 and may be embodied as a microprocessor, a microcontroller, a digital signal processor (DSP) or other device known in the art. The processor 1203 typically performs logical and arithmetic operations based on program instructions stored within the memory 1205.

The server device 1202 and/or client device 1204 typically also includes one or more communication interfaces 1207 for communicating with other electronic devices. The communication interfaces 1207 may be based on wired communication technology, wireless communication technology, or both. Examples of different types of communication interfaces 1207 include a serial port, a parallel port, a Universal Serial Bus (USB), an Ethernet adapter, an IEEE 13124 bus interface, a small computer system interface (SCSI) bus interface, an infrared (IR) communication port, a Bluetooth wireless communication adapter, and so forth.

The server device 1202 and/or client device 1204 typically also includes one or more input devices 1209 and one or more output devices 1211. Examples of different kinds of input devices 1209 include a keyboard, mouse, microphone, remote control device, button, joystick, trackball, touchpad, lightpen, etc. Examples of different kinds of output devices 1211 include a speaker, printer, etc. One specific type of output device which is typically included in a computer system is a display device 1213. Display devices 1213 used with embodiments disclosed herein may utilize any suitable image projection technology, such as a cathode ray tube (CRT), liquid crystal display (LCD), light-emitting diode (LED), gas plasma, electroluminescence, or the like. A display controller 1215 may also be provided, for converting data stored in the memory 1205 into text, graphics, and/or moving images (as appropriate) shown on the display device 1213.

Of course, FIG. 11 illustrates only one possible configuration of a server device 1202 and/or client device 1204. Various other architectures and components may be utilized.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A method for reducing effects of network and other variations on playback of media being streamed from a streaming server, the method comprising:
defining a lower limit for a level of a streaming buffer;
receiving a media stream from a streaming media server as a stream of media data;
playing back the media stream from the streaming buffer at a playback rate;
monitoring the level of the streaming buffer during the playback of the media file to determine whether the level of the streaming buffer is below the lower limit; and
if it is determined that the level of the streaming buffer is below the lower limit, setting the playback rate at a value that is less than an intended playback rate for the media stream, wherein the value of the set playback rate depends on the level of the streaming buffer;
wherein defining the lower limit for the level of the streaming buffer comprises evaluating a slow playback condition, and wherein the slow playback condition comprises a margin for the streaming buffer, and wherein the slow playback condition is given by:

$$(B(t)+tli-tfi)<(B^{Target}+T-B_L^{margin})$$

wherein B(t) is the level of the streaming buffer at time t, wherein (tli−tfi) indicates how much media data was added to the streaming buffer between time t and time t+T, wherein $B^{Target}$ is a target level for the streaming buffer, wherein T is a period of time, and wherein $B_L^{margin}$ is the margin for the streaming buffer.

2. The method of claim 1, wherein monitoring the level of the streaming buffer to determine whether the level of the streaming buffer is below the lower limit comprises:
determining the level of the streaming buffer at time t;
determining how much media data is added to the streaming buffer between time t and time t+T; and
evaluating the slow playback condition.

3. The method of claim 1, wherein setting the playback rate at a value that is less than the intended playback rate comprises multiplying the intended playback rate by a scaling factor that is less than one, and wherein the scaling factor depends on an estimated amount of data that will be received at the receiver.

4. The method of claim 1, wherein setting the playback rate at a value that is less than the intended playback rate comprises multiplying the intended playback rate by a scaling factor that is less than one, and further comprising calculating the scaling factor according to:

$$sf=(B(t)+tli-tfi)/(B^{Target}+T)$$

wherein sf is the scaling factor, wherein B(t) is the level of the streaming buffer at time t, wherein (tli−tfi) indicates how much media data was added to the streaming buffer between time t and time t+T, wherein $B^{Target}$ is a target level for the streaming buffer, and wherein T is a period of time.

5. The method of claim 1, wherein setting the playback rate at a value that is less than the intended playback rate comprises multiplying the intended playback rate by a scaling factor that is less than one, and further comprising calculating the scaling factor according to:

$$sf = \max\left(\frac{B(t)+t_0^R+\sum_{l=-(N-1)}^{-1}E(t_l^R)}{B^{Target}+(N+1)T}, sf_{min}\right)$$

wherein sf is the scaling factor, wherein B(t) is the level of the streaming buffer at time t, wherein $t_0^R$ indicates how much media data was added to the streaming buffer between time t and time t+T, wherein $B^{Target}$ is a target level for the streaming buffer, wherein $sf_{min}$ is the minimum scale factor, wherein $E(t_l^R)$ is an estimated amount of data that will be received in timestamp units at the receiver in the next $l^{th}$ time segment during the time [t−lT, t−(l−1)T), where l=−1, ..., −(N−1) and wherein T is a period of time.

6. The method of claim 1, further comprising:
defining an upper limit for the level of the streaming buffer;
monitoring the level of the streaming buffer during the playback of the media file to determine whether the level of the streaming buffer is above the upper limit; and
if it is determined that the level of the streaming buffer is above the upper limit, setting the playback rate at a value that is greater than an intended playback rate for the media stream, wherein the value of the playback rate depends on the level of the streaming buffer.

7. The method of claim 6, wherein defining the upper limit for the level of the streaming buffer comprises defining a fast playback condition, wherein the fast playback condition depends in part on an upper margin for the streaming buffer.

8. A method for reducing effects of network and other variations on playback of media being streamed from a streaming server, the method comprising:
defining a lower limit for a level of a streaming buffer, wherein defining the lower limit for the level of the streaming buffer comprises evaluating a slow playback condition, and wherein the slow playback condition comprises a margin for the streaming buffer;
defining an upper limit for the level of the streaming buffer, wherein defining the upper limit for the level of the streaming buffer comprises defining a fast playback condition, wherein the fast playback condition depends in part on an upper margin for the streaming buffer, and wherein the fast playback condition is given by:

$$(B(t)+tli-tfi)>(B^{Target}+T+B_U^{margin})$$

wherein B(t) is the level of the streaming buffer at time t, wherein (tli−tfi) indicates how much media data was added to the streaming buffer between time t and time t+T, wherein $B^{Target}$ is a target level for the streaming buffer, wherein T is a period of time, and wherein $B_U^{margin}$ is the upper margin for the streaming buffer;
receiving a media stream from a streaming media server as a stream of media data;
playing back the media stream from the streaming buffer at a playback rate;
monitoring the level of the streaming buffer during the playback of the media file to determine whether the level of the streaming buffer is below the lower limit and to determine whether the level of the streaming buffer is above the upper limit;
if it is determined that the level of the streaming buffer is below the lower limit, setting the playback rate at a value that is less than an intended playback rate for the media stream, wherein the value of the set playback rate depends on the level of the streaming buffer; and if it is determined that the level of the streaming buffer is above the upper limit, setting the playback rate at a value that is greater than an intended playback rate for the media stream, wherein the value of the playback rate depends on the level of the streaming buffer.

9. A method for reducing effects of network and other variations on playback of media being streamed from a streaming server, the method comprising:
defining a lower limit for a level of a streaming buffer, wherein defining the lower limit for the level of the streaming buffer comprises evaluating a slow playback condition, and wherein the slow playback condition comprises a margin for the streaming buffer;
defining an upper limit for the level of the streaming buffer, wherein defining the upper limit for the level of the streaming buffer comprises defining a fast playback condition, and wherein the fast playback condition is given by:

$$(B(t)+tli-tfi)>(B^{Target}+T)$$

wherein B(t) is the level of the streaming buffer at time t, wherein (tli−tfi) indicates how much media data was added to the streaming buffer between time t and time t+T, wherein $B^{Target}$ is a target level for the streaming buffer, and wherein T is a period of time;
receiving a media stream from a streaming media server as a stream of media data;
playing back the media stream from the streaming buffer at a playback rate;
monitoring the level of the streaming buffer during the playback of the media file to determine whether the level of the streaming buffer is below the lower limit and to determine whether the level of the streaming buffer is above the upper limit;
if it is determined that the level of the streaming buffer is below the lower limit, setting the playback rate at a value that is less than an intended playback rate for the media stream, wherein the value of the set playback rate depends on the level of the streaming buffer; and
if it is determined that the level of the streaming buffer is above the upper limit, setting the playback rate at a value that is greater than an intended playback rate for the media stream, wherein the value of the playback rate depends on the level of the streaming buffer.

10. The method of claim 6, wherein monitoring the level of the streaming buffer to determine whether the level of the streaming buffer is above the upper limit comprises:
determining the level of the streaming buffer at time t;
determining how much media data is added to the streaming buffer between time t and time t+T; and
evaluating the fast playback condition.

11. The method of claim 6, wherein setting the playback rate at a value that is greater than the intended playback rate comprises multiplying the intended playback rate by a scaling factor that is greater than one.

12. A method for reducing effects of network and other variations on playback of media being streamed from a streaming server, the method comprising:
defining a lower limit for a level of a streaming buffer, wherein defining the lower limit for the level of the streaming buffer comprises evaluating a slow playback condition, and wherein the slow playback condition comprises a margin for the streaming buffer;
defining an upper limit for the level of the streaming buffer;
receiving a media stream from a streaming media server as a stream of media data;
playing back the media stream from the streaming buffer at a playback rate;
monitoring the level of the streaming buffer during the playback of the media file to determine whether the level of the streaming buffer is below the lower limit and to determine whether the level of the streaming buffer is above the upper limit;
if it is determined that the level of the streaming buffer is below the lower limit, setting the playback rate at a value that is less than an intended playback rate for the media stream, wherein the value of the set playback rate depends on the level of the streaming buffer;
if it is determined that the level of the streaming buffer is above the upper limit, setting the playback rate at a value that is greater than an intended playback rate for the media stream, wherein the value of the playback rate depends on the level of the streaming buffer; and
wherein setting the playback rate at a value that is greater than the intended playback rate comprises multiplying the intended playback rate by a scaling factor that is greater than one, and further comprising calculating the scaling factor according to:

$$sf=(B(t)+tli-tfi-B^{Target})/(T)$$

wherein sf is the scaling factor, wherein B(t) is the level of the streaming buffer at time t, wherein (tli−tfi) indicates how much media data was added to the streaming buffer between time t and time t+T, wherein $B^{Target}$ is a target level for the streaming buffer, and wherein T is a period of time.

13. A method for reducing effects of network and other variations on playback of media being streamed from a streaming server, the method comprising:
defining a lower limit for a level of a streaming buffer, wherein defining the lower limit for the level of the streaming buffer comprises evaluating a slow playback condition, and wherein the slow playback condition comprises a margin for the streaming buffer;
defining an upper limit for the level of the streaming buffer;
receiving a media stream from a streaming media server as a stream of media data;
playing back the media stream from the streaming buffer at a playback rate;
monitoring the level of the streaming buffer during the playback of the media file to determine whether the level of the streaming buffer is below the lower limit and to determine whether the level of the streaming buffer is above the upper limit;
if it is determined that the level of the streaming buffer is below the lower limit, setting the playback rate at a value that is less than an intended playback rate for the media stream, wherein the value of the set playback rate depends on the level of the streaming buffer;
if it is determined that the level of the streaming buffer is above the upper limit, setting the playback rate at a value that is greater than an intended playback rate for the media stream, wherein the value of the playback rate depends on the level of the streaming buffer; and
wherein setting the playback rate at a value that is greater than the intended playback rate comprises multiplying the intended playback rate by a scaling factor that is greater than one, and further comprising calculating the scaling factor according to:

$$sf=(B(t)+tli-tfi)/(B^{Target}+n*T)$$

wherein sf is the scaling factor, wherein B(t) is the level of the streaming buffer at time t, wherein (tli−tfi)

indicates how much media data was added to the streaming buffer between time t and time t+T, wherein $B^{Target}$ is a target level for the streaming buffer, wherein n is an integer that is greater than or equal to zero, and wherein T is a period of time.

14. A method for reducing effects of network and other variations on playback of media being streamed from a streaming server, the method comprising:
   defining a lower limit for a level of a streaming buffer, wherein defining the lower limit for the level of the streaming buffer comprises evaluating a slow playback condition, and wherein the slow playback condition comprises a margin for the streaming buffer;
   defining an upper limit for the level of the streaming buffer;
   receiving a media stream from a streaming media server as a stream of media data;
   playing back the media stream from the streaming buffer at a playback rate;
   monitoring the level of the streaming buffer during the playback of the media file to determine whether the level of the streaming buffer is below the lower limit and to determine whether the level of the streaming buffer is above the upper limit;
   if it is determined that the level of the streaming buffer is below the lower limit, setting the playback rate at a value that is less than an intended playback rate for the media stream, wherein the value of the set playback rate depends on the level of the streaming buffer;
   if it is determined that the level of the streaming buffer is above the upper limit, setting the playback rate at a value that is greater than an intended playback rate for the media stream, wherein the value of the playback rate depends on the level of the streaming buffer; and
   wherein setting the playback rate at a value that is greater than the intended playback rate comprises multiplying the intended playback rate by a scaling factor that is greater than one, and further comprising calculating the scaling factor according to:

$$sf = \min\left(\frac{B(t) + t_0^R - B^{Target}}{T}, sf_{max}\right)$$

wherein sf is the scaling factor, wherein B(t) is the level of the streaming buffer at time t, wherein $t_0^R$ indicates how much media data was added to the streaming buffer between time t and time t+T, wherein $B^{Target}$ is a target level for the streaming buffer, wherein $sf_{max}$ is the maximum scale factor, and wherein T is a period of time.

15. A method for reducing effects of network and other variations on playback of media being streamed from a streaming server, the method comprising:
   defining a lower limit for a level of a streaming buffer, wherein defining the lower limit for the level of the streaming buffer comprises evaluating a slow playback condition, and wherein the slow playback condition comprises a margin for the streaming buffer;
   defining an upper limit for the level of the streaming buffer;
   receiving a media stream from a streaming media server as a stream of media data;
   playing back the media stream from the streaming buffer at a playback rate;
   monitoring the level of the streaming buffer during the playback of the media file to determine whether the level of the streaming buffer is below the lower limit and to determine whether the level of the streaming buffer is above the upper limit;
   if it is determined that the level of the streaming buffer is below the lower limit, setting the playback rate at a value that is less than an intended playback rate for the media stream, wherein the value of the set playback rate depends on the level of the streaming buffer;
   if it is determined that the level of the streaming buffer is above the upper limit, setting the playback rate at a value that is greater than an intended playback rate for the media stream, wherein the value of the playback rate depends on the level of the streaming buffer; and
   wherein setting the playback rate at a value that is greater than the intended playback rate comprises multiplying the intended playback rate by a scaling factor that is greater than one, and further comprising calculating the scaling factor according to:

$$sf = \min\left(\frac{B(t) + t_0^R}{B^{Target} + nT}, sf_{max}\right)$$

wherein sf is the scaling factor, wherein B(t) is the level of the streaming buffer at time t, wherein $t_0^R$ indicates how much media data was added to the streaming buffer between time t and time t+T, wherein $B^{Target}$ is a target level for the streaming buffer, wherein n is an integer that is greater than or equal to zero, wherein $sf_{max}$ is the maximum scale factor and wherein T is a period of time.

16. The method of claim 1, wherein the level of the streaming buffer is monitored periodically.

17. The method of claim 1, further comprising ensuring that the playback rate does not decrease below a defined minimum value.

18. The method of claim 1, further comprising ensuring that the playback rate does not increase above a defined maximum value.

19. The method of claim 1, wherein the method is implemented by a streaming client that is in wireless communication with the streaming server.

20. A non-transitory computer-readable storage medium comprising instructions that are executable by a processor to:
   define a lower limit for a level of a streaming buffer;
   receive media from a streaming media server as a stream of media data;
   play back the media stream from the streaming buffer at a playback rate;
   monitor the level of the streaming buffer during the playback of the media stream to determine whether the level of the streaming buffer is below the lower limit; and
   if it is determined that the level of the streaming buffer is below the lower limit, set the playback rate at a value that is less than an intended playback rate for the media stream, wherein the value of the playback rate depends on the level of the streaming buffer;
   wherein defining the lower limit for the level of the streaming buffer comprises evaluating a slow playback condition, and wherein the slow playback condition comprises a margin for the streaming buffer, and wherein the slow playback condition is given by:

$$(B(t)+tli-tfi) < (B^{Target}+T-B_L^{margin})$$

wherein B(t) is the level of the streaming buffer at time t, wherein (tli−tfi) indicates how much media data was added to the streaming buffer between time t and time t+T, wherein $B^{Target}$ is a target level for the streaming buffer, wherein T is a period of time, and wherein $B_L^{margin}$ is the margin for the streaming buffer.

21. A client device that is configured to reduce effects of network and other variations on playback of media that is being streamed from a streaming server, the client device comprising:
a processor;
memory in electronic communication with the processor;
instructions stored in the memory, the instructions being executable to:
define a lower limit for a level of a streaming buffer;
receive media from a streaming media server as a stream of media data;
play back the media stream from the streaming buffer at a playback rate;
monitor the level of the streaming buffer during the playback of the media stream to determine whether the level of the streaming buffer is below the lower limit; and
if it is determined that the level of the streaming buffer is below the lower limit, set the playback rate at a value that is less than an intended playback rate for the media stream, wherein the value of the playback rate depends on the level of the streaming buffer;
wherein defining the lower limit for the level of the streaming buffer comprises evaluating a slow playback condition, and wherein the slow playback condition comprises a margin for the streaming buffer, and wherein the slow playback condition is given by:

$$(B(t)+tli-tfi) < (B^{Target}+T-B_L^{margin})$$

wherein B(t) is the level of the streaming buffer at time t, wherein (tli–tfi) indicates how much media data was added to the streaming buffer between time t and time t+T, wherein $B^{Target}$ is a target level for the streaming buffer, wherein T is a period of time, and wherein $B_L^{margin}$ is the margin for the streaming buffer.

22. The a non-transitory computer-readable storage medium of claim 20, wherein monitoring the level of the streaming buffer to determine whether the level of the streaming buffer is below the lower limit comprises:
determining the level of the streaming buffer at time t;
determining how much media data is added to the streaming buffer between time t and time t+T; and
evaluating the slow playback condition.

23. The a non-transitory computer-readable storage medium of claim 20, wherein setting the playback rate at a value that is less than the intended playback rate comprises multiplying the intended playback rate by a scaling factor that is less than one, and wherein the scaling factor depends on an estimated amount of data that will be received at the receiver.

24. The a non-transitory computer-readable storage medium of claim 20, further comprising instructions that are executable by the processor to:
define an upper limit for the level of the streaming buffer;
monitor the level of the streaming buffer during the playback of the media file to determine whether the level of the streaming buffer is above the upper limit; and
if it is determined that the level of the streaming buffer is above the upper limit, set the playback rate at a value that is greater than an intended playback rate for the media stream, wherein the value of the playback rate depends on the level of the streaming buffer.

25. The a non-transitory computer-readable storage medium of claim 24, wherein defining the upper limit for the level of the streaming buffer comprises defining a fast playback condition, wherein the fast playback condition depends in part on an upper margin for the streaming buffer.

26. The a non-transitory computer-readable storage medium of claim 24, wherein monitoring the level of the streaming buffer to determine whether the level of the streaming buffer is above the upper limit comprises:
determining the level of the streaming buffer at time t;
determining how much media data is added to the streaming buffer between time t and time t+T; and
evaluating the fast playback condition.

27. The a non-transitory computer-readable storage medium of claim 24, wherein setting the playback rate at a value that is greater than the intended playback rate comprises multiplying the intended playback rate by a scaling factor that is greater than one.

28. The a non-transitory computer-readable storage medium of claim 20, wherein the level of the streaming buffer is monitored periodically.

29. The a non-transitory computer-readable storage medium of claim 20, further comprising instructions that are executable by the processor to ensure that the playback rate does not decrease below a defined minimum value.

30. The a non-transitory computer-readable storage medium of claim 20, further comprising instructions that are executable by the processor to ensure that the playback rate does not increase above a defined maximum value.

31. The client device of claim 21, wherein monitoring the level of the streaming buffer to determine whether the level of the streaming buffer is below the lower limit comprises:
determining the level of the streaming buffer at time t;
determining how much media data is added to the streaming buffer between time t and time t+T; and
evaluating the slow playback condition.

32. The client device of claim 21, wherein setting the playback rate at a value that is less than the intended playback rate comprises multiplying the intended playback rate by a scaling factor that is less than one, and wherein the scaling factor depends on an estimated amount of data that will be received at the receiver.

33. The client device of claim 21, wherein the instructions are further executable to:
define an upper limit for the level of the streaming buffer;
monitor the level of the streaming buffer during the playback of the media file to determine whether the level of the streaming buffer is above the upper limit; and
if it is determined that the level of the streaming buffer is above the upper limit, set the playback rate at a value that is greater than an intended playback rate for the media stream, wherein the value of the playback rate depends on the level of the streaming buffer.

34. The client device of claim 33, wherein defining the upper limit for the level of the streaming buffer comprises defining a fast playback condition, wherein the fast playback condition depends in part on an upper margin for the streaming buffer.

35. The client device of claim 33, wherein monitoring the level of the streaming buffer to determine whether the level of the streaming buffer is above the upper limit comprises:
determining the level of the streaming buffer at time t;
determining how much media data is added to the streaming buffer between time t and time t+T; and
evaluating the fast playback condition.

36. The client device of claim 33, wherein setting the playback rate at a value that is greater than the intended playback rate comprises multiplying the intended playback rate by a scaling factor that is greater than one.

37. The client device of claim 21, wherein the level of the streaming buffer is monitored periodically.

38. The client device of claim 21, wherein the instructions are further executable to ensure that the playback rate does not decrease below a defined minimum value.

39. The client device of claim 21, wherein the instructions are further executable to ensure that the playback rate does not increase above a defined maximum value.

* * * * *

UNITED STATES PATENT AND TRADEMARK OFFICE
CERTIFICATE OF CORRECTION

PATENT NO. : 7,711,841 B2
APPLICATION NO. : 11/426878
DATED : May 4, 2010
INVENTOR(S) : Sachin G. Deshpande It is certified that error appears in the above-identified patent and that said Letters Patent is hereby corrected as shown below:

In column 21, line 41 please delete "The a non-transitory" and replace it with --The non-transitory--.
In column 21, line 49 please delete "The a non-transitory" and replace it with --The non-transitory--.
In column 21, line 55 please delete "The a non-transitory" and replace it with --The non-transitory--.
In column 22, line 1 please delete "The a non-transitory" and replace it with --The non-transitory--.
In column 22, line 6 please delete "The a non-transitory" and replace it with --The non-transitory--.
In column 22, line 14 please delete "The a non-transitory" and replace it with --The non-transitory--.
In column 22, line 19 please delete "The a non-transitory" and replace it with --The non-transitory--.
In column 22, line 22 please delete "The a non-transitory" and replace it with --The non-transitory--.
In column 22, line 26 please delete "The a non-transitory" and replace it with --The non-transitory--.

Signed and Sealed this

Twenty-eighth Day of September, 2010

David J. Kappos
*Director of the United States Patent and Trademark Office*